United States Patent
Doshi et al.

(10) Patent No.: US 8,924,933 B2
(45) Date of Patent: Dec. 30, 2014

(54) METHOD AND SYSTEM FOR AUTOMATED TESTING OF COMPUTER APPLICATIONS

(75) Inventors: Ketan Doshi, Mumbai (IN); Saiprasad Muzumdar, Mumbai (IN); Shailendra Jadhav, Mumbai (IN); Raj K. Singh, Pune (IN)

(73) Assignee: Barclays Capital Inc., New York, NY (US)

( * ) Notice: Subject to any disclaimer, the term of this patent is extended or adjusted under 35 U.S.C. 154(b) by 1320 days.

(21) Appl. No.: 12/055,229

(22) Filed: Mar. 25, 2008

(65) Prior Publication Data

US 2009/0249297 A1 Oct. 1, 2009

(51) Int. Cl.
G06F 9/44 (2006.01)
G06F 11/00 (2006.01)
G06F 11/36 (2006.01)

(52) U.S. Cl.
CPC .................... *G06F 11/3668* (2013.01)
USPC .......................................... 717/124; 714/38.1

(58) Field of Classification Search
USPC ....................................................... 717/124
See application file for complete search history.

(56) References Cited

U.S. PATENT DOCUMENTS

| | | | | |
|---|---|---|---|---|
| 5,021,997 | A * | 6/1991 | Archie et al. | 714/31 |
| 6,157,940 | A * | 12/2000 | Marullo et al. | 703/27 |
| 7,206,825 | B1 * | 4/2007 | Sauriol et al. | 709/220 |
| 7,424,384 | B2 * | 9/2008 | Wheeler et al. | 702/121 |
| 7,552,044 | B2 * | 6/2009 | Xu et al. | 703/20 |
| 2003/0005416 | A1 * | 1/2003 | Henftling et al. | 717/129 |
| 2005/0229043 | A1 * | 10/2005 | Nasuti et al. | 714/38 |
| 2006/0005170 | A1 * | 1/2006 | Rosaria et al. | 717/126 |
| 2007/0061780 | A1 * | 3/2007 | Pokluda et al. | 717/124 |
| 2007/0168970 | A1 | 7/2007 | Li et al. | |
| 2007/0240118 | A1 | 10/2007 | Keren | |

OTHER PUBLICATIONS

Bertolino et al., "Software Testing Research: Achievements, Challenges, Dreams," IEEE, 2007, 17pg.*
Koopman et al., "Gast: Generic Automated Software Testing," Springer-Verlag, 2003, 16pg.*
Written Opinion of PCT/US2009/001852 dated May 18, 2009, 3 pages.
International Search Report of PCT/US2009/001852 dated May 18, 2009, 3 pages.
International Preliminary Report on Patentability of PCT/US2009/001852 dated Oct. 10, 2010, 5 pages.
Publication of PCT/US2009/001852 dated Oct. 1, 2009, 39 pages.

* cited by examiner

*Primary Examiner* — Ryan Coyer
(74) *Attorney, Agent, or Firm* — Morgan Lewis & Bockius LLP

(57) ABSTRACT

A system includes a testing device to test a computer application in conjunction with a testing tool, the testing device including a test automation engine to initiate a test, the test automation engine including a programmable data source that is testing tool universal, the programmable data source including one or more automation test scripts that define the test and a data storage device to store results from testing the computer application.

19 Claims, 14 Drawing Sheets

| module | testscript | execute flag | testscript step number | testscript step name | testcase name |
|---|---|---|---|---|---|
| Test Case Related Information ||||||
| CATSCredit | New Trade | Y | 1 | Select Product | VerifyNewTrade |
| | | | 1 | New Trade Ticket | VerifyNewTrade |
| | | | | Verify new Trade Ticket | VerifyNewTrade |
| | | | | Close New Trade Ticket | VerifyNewTrade |
| Enter Security | New Trade | | | Select Product | Enter Security |
| | | | | New Trade Ticket | Enter Security |
| | | | | Verify new Trade Ticket | Enter Security |
| | | | | Enter Security | Enter Security |
| | | | | Close New Trade Ticket | Enter Security |

FIG. 2A

| set datasheet to | goto datasheet row number | if datasheet current row number is | if datasheet row condition true goto testscript step | if datasheet row condition false goto testscript step number |
|---|---|---|---|---|
| Data Sheet Related Information(If Required) | | | | |
| | | | | |
| | | | | |
| | | | | |
| | | | | |
| | | | | |
| | | | | |
| C:\SalesStation\Automation\Hybrid Automation\SalesStation\CATS Credit\Data Files\SaleStation_CATSCredit_TestData.xls | | | | |
| | 1 | | | |
| | | | | |

FIG. 2B

| assign to variable name | assign value |
|---|---|
| External Variables(If Required) | |
| | |
| | |
| | |
| | |
| | |
| | |
| | |
| | |
| | |

FIG. 2C

| execute component/function | precondition for executing component/function | variable name in which function will | component/function parameters | postcondition after executing component/function |
|---|---|---|---|---|
| Component Related Information ||||| 
| | | | | |
| | | | | |
| | | | | |
| | | | | |
| | | | | |
| | | | | |
| | | | | |
| | | | | |
| | | | DT(CUSIP) | |
| | checkCompStatus(2.E_OK) | | | |

FIG. 2D

| status to be reported if postcondition true | description to be reported if postcondition true | goto testscript step number if | status to be reported if postcondition false | description to be reported if postcondition false | goto testscript step number if postcondition false |
|---|---|---|---|---|---|
| *Test Result Related Information* ||||||
|  | Selected the App |  | PASS | Not Able to Select the App |  |
|  | New Trade Ticket Invoked |  |  | Not Able to Invoke New Trade Ticket |  |
|  | Verification of New Trade Ticket Passed. |  |  | Verification of New Trade Ticket Failed. |  |
|  | New Trade ticket closed. |  |  | New Trade ticket cannot be closed. |  |
|  | Selected the App |  |  | Not Able to Select the App |  |
|  | New Trade Ticket Invoked |  |  | Not Able to Invoke New Trade Ticket |  |
|  | Verification of New Trade Ticket Passed. |  |  | Verification of New Trade Ticket Failed. |  |
|  | Security Entered |  |  | Security Not Entered |  |
|  | New Trade ticket closed. |  |  | New Trade ticket cannot be closed. |  |

FIG. 2E

| Component Name | Parameters | Desc |
|---|---|---|
| SalesStation_CATSCredit_SelectCatsCredit | None | For Selecting the Product of SalesStation |
| SalesStation_CATSCredit_NewTradeTicket | None | Invoke the New Trade ticket window |
| SalesStation_CATSCredit_VerifyNewTradeTicket | None | This will verify the New Trade Ticket Window for SS, TradeDate, Client Order Time and Trader Contact Time |
| SalesStation_CATSCredit_EnterSecurity | Security | This will enter the Security in the New Trade Ticket window. |
| SalesStation_CATSCredit_CloseNewTradeTicket | None | This will close the New Trade Ticket Window |

FIG. 2F

| execute component/function | precondition for executing component/ function | variable name in which function will return value | component/f unction parameters | postcondition after executing component/ function | status to be reported if post-condition true | description to be reported if post-condition true | goto testscript step number if post-condition true | status to be reported if post-condition false | description to be reported if post-condition false | goto testscript step number if post-condition false |
|---|---|---|---|---|---|---|---|---|---|---|
| SalesStation_ CATSCredit_ SelectCatsCredit | checkCompStatus (2,E_OK) | | | checkCompStatus (1,E_OK) | PASS | | | FAIL | | EXIT |
| SalesStation_ CATSCredit_ NewTradeTicket | checkCompStatus (2,E_OK) | | | checkCompStatus (2,E_OK) | FAIL | | | PASS | | |
| SalesStation_ CATSCredit_ VerifyNewTradeTicket | | | | checkCompStatus (3,E_OK) | | | | | | |
| SalesStation_ CATSCredit_ CloseNewTradeTicket | | | | checkCompStatus (4,E_OK) | | | | | | |
| SalesStation_ CATSCredit_ SelectCatsCredit | | | | checkCompStatus (1,E_OK) | | | | | | |
| SalesStation_ CATSCredit_ NewTradeTicket | | | | checkCompStatus (2,E_OK) | | | | | | |
| SalesStation_ CATSCredit_ VerifyNewTradeTicket | | | | checkCompStatus (3,E_OK) | | | | | | |
| SalesStation_ CATSCredit_ EnterSecurity | | | | | | | | | | |
| SalesStation_ CATSCredit_ CloseNewTradeTicket | | | | | | | | | | |

FIG. 2G

METHOD AND SYSTEM FOR AUTOMATED TESTING OF COMPUTER APPLICATIONS

BACKGROUND OF THE INVENTION

1. Field of the Invention

The present invention relates to a method and system for automated testing of computer applications, and more importantly, to a method and system for establishing an automated testing framework for creating and managing automated testing suites for computer applications.

2. Discussion of the Related Art

Given the dynamic nature of an organization's operations, computer applications that support the key business functions undergo rapid changes. Any newly developed applications need to be tested thoroughly before being deployed in the organization's system. Testing the applications manually as it is done today is not very efficient or effective. Test automation is the key to testing these applications efficiently and effectively. One challenge in test automation is that the automation has to be consistent across applications and operational groups within the organization. In general, test automation needs automation engineers that have expertise on the automation tools that are used for the organization. Standard testing frameworks, such as modular, data driven, and key word driven frameworks available in today's market rely heavily on the efforts of the automation engineers to customize the test automation for each application and operational groups in each organization. Any changes to the test scripts have to be programmed by the automation engineers, which reduces the speed of automation.

SUMMARY OF THE INVENTION

Accordingly, the present invention is directed to a method and system for automated testing of computer applications that substantially obviates one or more problems due to limitations and disadvantages of the related art.

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system includes a testing device to test a computer application in conjunction with a testing tool, the testing device including a test automation engine to initiate a test, the test automation engine including a programmable data source that is testing tool universal, the programmable data source including one or more automation test scripts that define the test and a data storage device to store results from testing the computer application.

In another aspect, a method includes accessing a test automation engine in a testing device to test a computer application in conjunction with a testing tool, configuring a programmable data source that is testing tool universal, the programmable data source including one or more automation test scripts, and testing the computer application in accordance with the one or more automation test scripts in conjunction with the testing tool to generate test results.

In yet another aspect, a computer program product includes a computer readable medium having stored thereon computer executable instructions that, when executed on a computer, configure the computer to perform the steps including accessing a test automation engine in a testing device to test a computer application in conjunction with a testing tool, configuring a programmable data source that is testing tool universal, the programmable data source including one or more automation test scripts, and testing the computer application in accordance with the one or more automation test scripts in conjunction with the testing tool to generate test results.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 2A-2E show exemplary fields of automated test scripts;

FIG. 2F illustrates an example of the business components needed to be called;

FIG. 2G illustrates an example of the conditions of business components;

DETAILED DESCRIPTION OF THE INVENTION

Reference will now be made in detail to the embodiments of the present invention, examples of which are illustrated in the accompanying drawings. Wherever possible, like reference numbers will be used for like elements.

Figure 1:
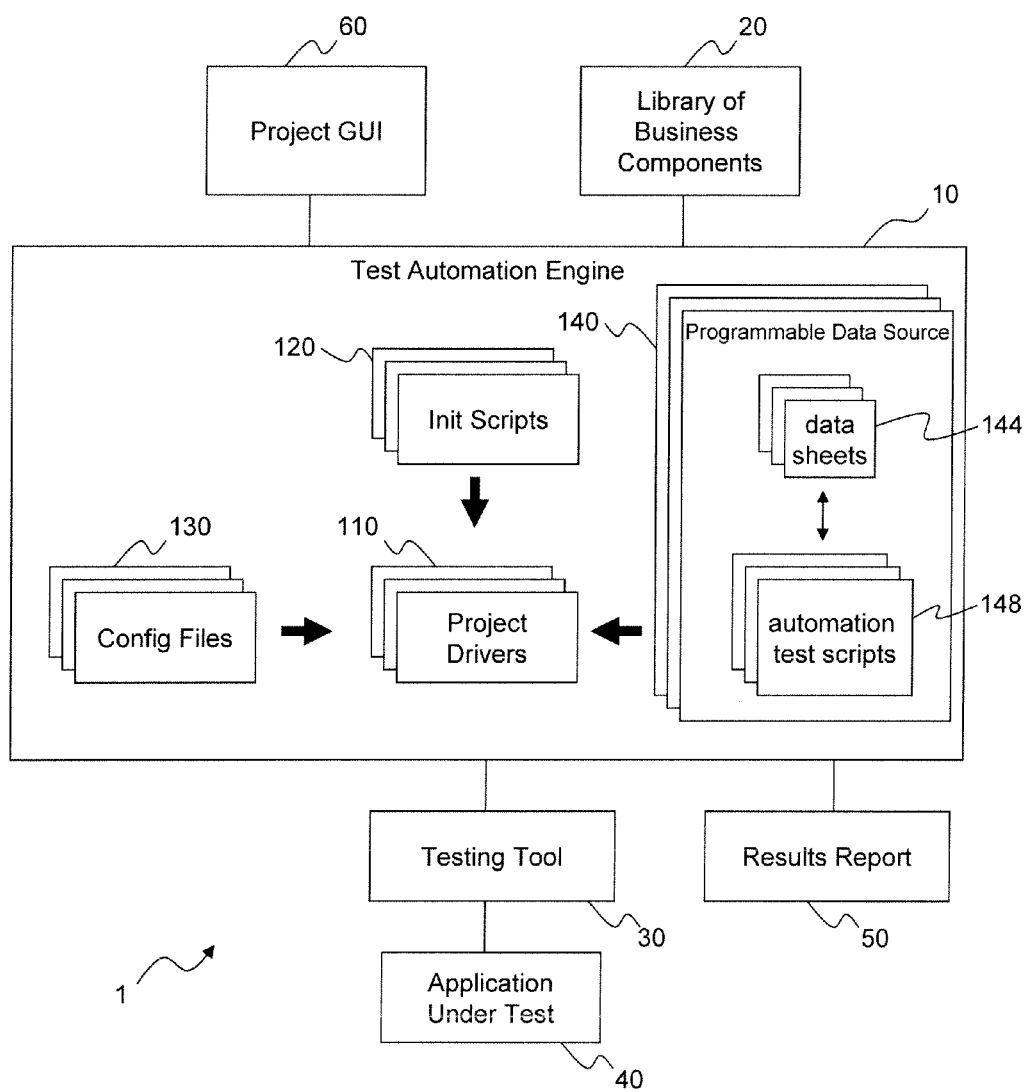
FIG. 1 shows a diagram of a test automation system and framework in accordance with an exemplary embodiment of the present invention.

FIG. 1 shows a diagram of a test automation system and framework in accordance with an exemplary embodiment of the present invention. The test automation system and framework 1 in accordance with the present invention includes basic rules and structure for developing automation scripts and testing new applications to ensure consistent performance across applications. To enhance the speed and efficiency of the test automation, the test automation system and framework in accordance with the present invention allows subject matter experts (e.g., the manual testers) to create the automation scripts by using reusable automated business components created by the automation engineers. In the system and framework in accordance with the present invention, test scripts are created using a test automation engine that allows the manual testers to define the business logic and combine the reusable business components developed by the automation engineers to quickly and efficiently generate automated tests to evaluate the new applications.

As shown in FIG. 1, the test automation system and framework 1 includes a test automation engine 10 and a library of business components 20 in conjunction with a testing tool 30 to test an application under test 40. The test automation engine 10 includes project drivers 110, initialization scripts ("init scripts") 120, configuration files ("config files") 130, and programmable data source 140 to provide the testing tool 30 with the testing logic, functions, and business components to test the application under test 40.

The project drivers 110 prepare the test automation engine 10 using the init scripts 120 and config files 130 to test the application under test 40. For example, the init scripts 120 initialize the global variables and constants, establish a runtime environment compatible with the testing tool 30 (e.g., WinRunner®, QuickTest Pro®(QTP), etc.), and load project GUI maps, object repositories, project function libraries, and generic function libraries. The config files 130 include details related to the run mode of the scripts. For example, config files 130 may define the run mode as "All," "Module," or "Selected." It is to be understood that other run modes may be implemented without departing from the scope of the present invention. In case of the "Module" or "Selected" run mode, the appropriate modules or the test cases that are to be part of the current execution are selected from the programmable data source 140. In addition, the config files 130 may also include other details used by the project drivers 110, such as whether the results of the test are to be emailed to a user. For example, the following may be a definition included in a config file 130 to designate a "Module" run mode with no emailing of the results file:

RunMode="Module"
SendMail=False

Once the configuration and initialization has been completed, the project drivers 110 read the programmable data source 140 containing the automation test scripts and execute the scripts to perform the test. The project drivers 110 also generate the detailed and summary results report. Separate project drivers 110 are developed to support the underlying testing tools for test automation. For example, separate project drivers are created for testing tools WinRunner® and QTP®. The details of the operation of the project drivers 110 will be explained further below.

The library of business components 20 is a project library of automated business functions. The business components contain the business logic that generally perform a set of steps for a specific business task and, based on certain conditions, return to the caller of this function a pass/fail status in the form of symbolic codes. An exemplary approach for the automation design of a business component is as described below.

A business component function can take input or output parameters and execute the steps of the business component. It will also handle expected/unexpected application errors, which may occur on executing the business component steps. In case of expected errors occurring in the application, the business component will return appropriate symbolic error codes pertaining to the error that occurred. The application error messages to check for in the business component are not hard coded in the component. If the business component executes successfully without any errors, then it will return the symbolic code for the pass status. A successfully executed business component reports the details of the executed test steps, indicating the status of the step as "ERROR," if any occurred while executing that step or " " (i.e., null) if no error occurred while executing that step.

The library of business components 20 includes business components that are developed by automation engineers using test automation tools (i.e., testing tool 30), such as WinRunner® and QTP®, underlying the framework of the present invention. Because the functional design of the automation testing system and framework according to the present invention remain the same irrespective of the test automation tool, other standard test automation tools may be used to develop the business components without departing from the scope of the present invention.

The programmable data source 140 includes data sheets 144 and automation test scripts 148, which provide the specific scenarios for testing the application under test 40. The automated test scripts are created by the manual testers to describe the logic of a test scenario and how various business components from the library of business components 20 are to be combined together to perform a business function to be tested in the application under test 40.

More specifically, the programmable data source 140 creates the test cases specific to the application under test 40. These test cases refer to the appropriate data sheets 144 that contain the test data for the execution as well as business components to be called, sequence of the test steps, the preconditions, and the post-conditions. The programmable data source 140 is tool universal. For example, the formats supported are Excel Sheet, CVS (comma separated values), and any ANSI compliant relational database. Similarly, the programmable data source user interface is in tool universal format. For example, the programmable data source user interface 140 may be implemented in Java and Visual Basic Scripts (VBS).

In an exemplary embodiment of the present invention, the format for an automation test script includes the following fields:

TABLE 1

| Column Name | Column Description | Mandatory/ Optional | Comments |
| --- | --- | --- | --- |
| Module | The name of the module to which the test script belongs. | Optional. At least one module name should be present in the file. | The module name need not be repeated till a new module begins. |
| Testscript | The name of the automation test script. | Optional. At least one testscript name should be present in the file. | The test script name need not be repeated till a new module begins. |
| Execute flag | A flag which determines whether to execute the module/test script. | Optional | This flag will be "Y" or "N". The flag will not be checked for if the run mode in the driver config file is "all". The |

TABLE 1-continued

| Column Name | Column Description | Mandatory/ Optional | Comments |
| --- | --- | --- | --- |
| | | | flag will be checked for each test script, if the run mode in the driver config file is "selected". The flag will be checked only for each module, if the run mode in the driver config file is "modular". |
| Testscript step number | A step number for each step of a test script, starting from 1 and incrementing by 1 for the subsequent steps. | Mandatory | The step number will restart from 1 for every new test script. |
| Testscript step name | A descriptive name for the test script step. | Optional | |
| Testcase name | A descriptive name for the test case of which the step is. | Optional | |
| Set datasheet to | The full path name of the data file which should be set as the current data file for the test script. | Optional | |
| Goto datasheet row number | The row number which should be set as the current row in the current data file for the test script. | Optional | If this field is "NEXTROW", the current row number in the current data file will be incremented by 1 |
| If datasheet current row number is | The condition to be validated for the current row number of the current data file. | Optional | If this field is "EOF", then the condition will be true, if end of file has been reached for the current data file. |
| If datasheet row condition true goto testscript step number | The test script step number to jump to if the condition specified in the field "If datasheet current row number is" is true. | Optional | If this field is "EXIT", then the execution will terminate for the current test script and jump to the next test script. If this field is "END", then the execution will terminate for the current test script and will end altogether. |
| If datasheet row condition false goto testscript step number | The test script step number to jump to if the condition specified in the field "If datasheet current row number is" is false. | Optional | If this field is "EXIT", then the execution will terminate for the current test script and jump to the next test script. If this field is "END", then the execution will terminate for the current test script and will end altogether. |
| Assign to variable name | The variable name to which the specified value will be assigned. | Optional | |
| Assign value | The value to be assigned to the specified variable. | Optional | This value can be a string constant enclosed within double quotes, a numeric constant, another variable name, or a value parameterized from the data file, which is specified in the form DT("<column name in the data file>"). The parameterized value will be replaced by the value fetched from the current row and the specified column of the current data file. |
| Execute component/function | Name of the business component function or any other function which is to be executed. | Optional | |
| Precondition for executing component/function | A boolean condition which should be true, for the component/function to be executed. | Optional | This field can contain logical AND, OR, NOT operators. It can also contain a the keyword checkCompStatus(<step number>, <expected return status of the component |

TABLE 1-continued

| Column Name | Column Description | Mandatory/Optional | Comments |
| --- | --- | --- | --- |
| | | | executed in the specified step number>). The checkCompStatus condition will be true, if the actual return status of the component executed in the specified step number is same as the specified expected return status, and false otherwise. |
| Variable name in which function will return value | The name of the variable in which to store the return value of the executed function. | Optional | |
| Component/function parameters | A comma separated list of values to be passed as arguments to the executed component/function. | Optional | An argument can be a string constant enclosed within double quotes, a numeric constant, another variable name, or a value parameterized from the data file, which is specified in the form DT("<column name in the data file>"). The parameterized value will be replaced by the value fetched from the current row and the specified column of the current data file. |
| Postcondition after executing component/function | A boolean condition validated after executing the specified component/function, if any. | Optional | This field can contain logical AND, OR, NOT operators. It can also contain a the keyword checkCompStatus(<step number>, <expected return status of the component executed in the specified step number>). The checkCompStatus condition will be true, if the actual return status of the component executed in the specified step number is same as the specified expected return status, and false otherwise. |
| Status to be reported if postcondition true | The status "PASS" or "FAIL" for the test script step, which should be reported to the results sheet, if the post condition is true or if the post condition is not specified. | Optional | |
| Description to be reported if postcondition true | The description for the test script step, which should be reported to the results sheet, if the post condition is true or if the post condition is not specified. | Optional | |
| Goto testscript step number if postcondition true | The test script step number to jump to if the postcondition specified in the field "Postcondition after executing component/function" is true or or if the post condition is not specified. | Optional | If this field is "EXIT", then the execution will terminate for the current test script and jump to the next test script. If this field is "END", then the execution will terminate for the current test script and will end altogether. |
| Status to be reported if postcondition false | The status "PASS" or "FAIL" for the test script step, which should be reported to the results sheet, if the post condition is false. | Optional | |

TABLE 1-continued

| Column Name | Column Description | Mandatory/Optional | Comments |
|---|---|---|---|
| Description to be reported if postcondition false | The description for the test script step, which should be reported to the results sheet, if the post condition is false. | Optional | |
| Goto testscript step number if postcondition false | The test script step number to jump to if the postcondition specified in the field "Postcondition after executing component/function" is false | Optional | If this field is "EXIT", then the execution will terminate for the current test script and jump to the next test script. If this field is "END", then the execution will terminate for the current test script and will end altogether. |

FIGS. 2A-2G show an exemplary programmable data source 140. In particular, FIGS. 2A-2E are directed to the automated test scripts. FIG. 2A illustrates an example of test case related information in the programmable data source 140. FIG. 2B illustrates an example of data sheet related information in the programmable data source 140. FIG. 2C illustrates an example of external variable information in the programmable data source 140. FIG. 2D illustrates an example of business component related information in the programmable data source 140. FIG. 2E illustrates an example of test result related information in the programmable data source 140. FIGS. 2F and 2G are directed to the data sheets 144. FIG. 2F illustrates an example of the business components needed to be called. FIG. 2G illustrates an example of the conditions of the business components.

Once the application under test 40 has been tested, the execution results are stored in a results report file 50. In one exemplary embodiment of the present invention, the results files created include a "Summary Results Report" for reporting the automation execution results to the test managers and senior management and the "Detailed Results Report" for the test automation experts to debug if there are any issues. The summary report may include details about the pass/fail status of all the test cases and the pass/fail statistics summary. The detailed results report may include details about individual test cases, their test steps, pass/fail status, associated description, and time stamp. The exemplary embodiment of the present invention also includes a provision to feed the results back to the test management tool used, such as Mercury's test management tool Quality Center™.

Figure 3:
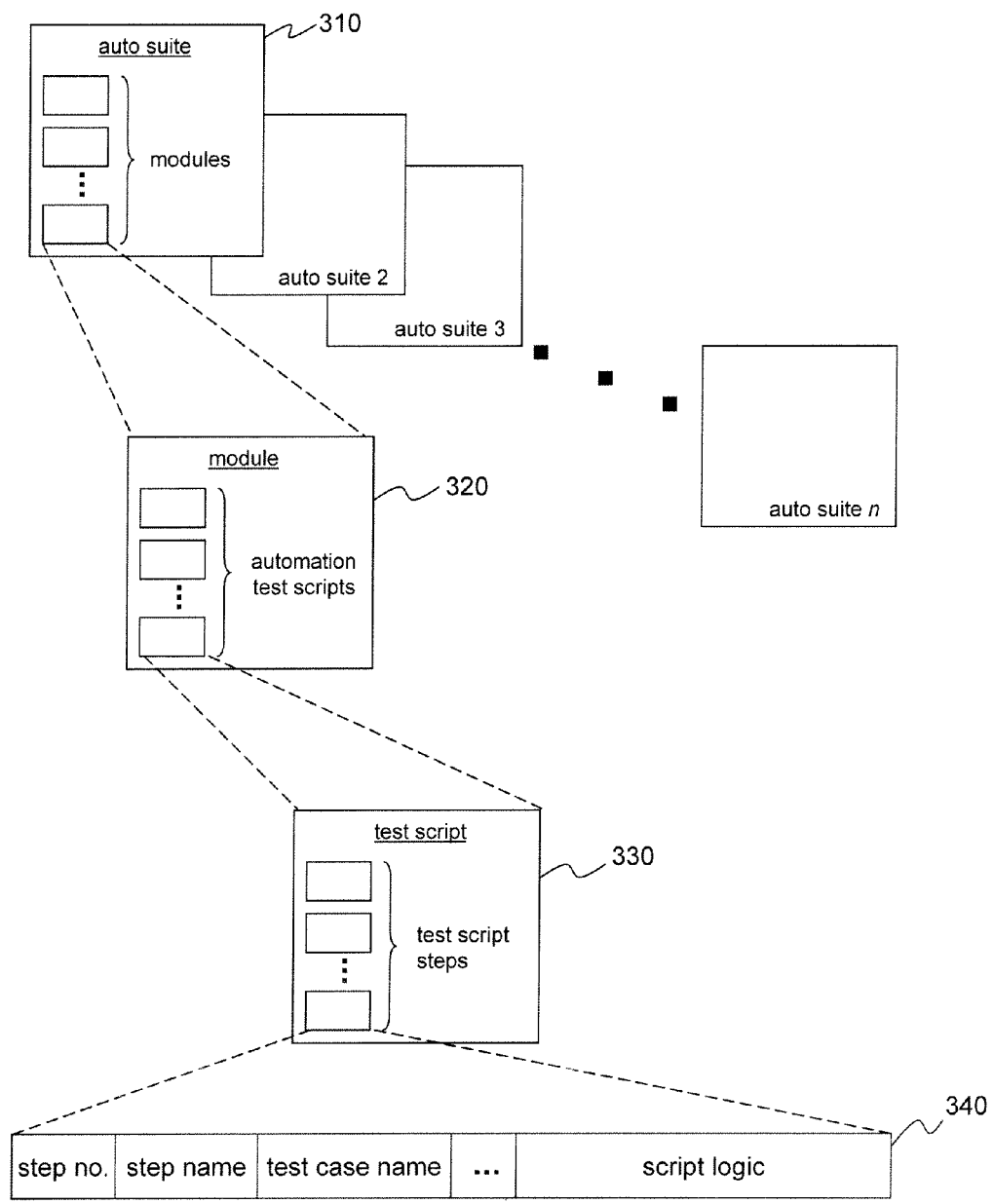
FIG. 3 shows a diagram of an exemplary organization of the automation test scripts in accordance with the present invention.

The automation test scripts 148 in the programmable data source 140 are created by a user, such as a manual tester, for example, through the project graphic user interface (GUI) 60 (FIG. 1). FIG. 3 shows a diagram of an exemplary organization of the automation test scripts in accordance with the present invention. As shown in FIG. 3, each "automation suite" 310 (i.e., programmable data source) includes one or more test "modules" 320, each module 320 includes one or more "automation test scripts" 320, and each automation test script 320 includes one or more "test script steps" 330. Each test script step 340 includes the details of the logic that step is to perform during the testing of the application under test 40. For example, each test script step 340 may be defined by the fields described above in Table 1 and as shown in FIGS. 2A-2E.

In one exemplary embodiment of the present invention, when the project GUI 60 is accessed by a user, the project GUI 60 guides the user to either create a new automation suite 310 or edit an existing one. Depending on the choice, the project GUI 60 guides the user to either create new modules 320 or edit existing ones in the automation suite 310. The project GUI 60 provides a list of all of the test scripts 330 within the modules 320 and allows the user to edit or create new test scripts 330 to be part of the module 320. To edit or create a test script step 330, the project GUI 60 provides the user with the fields to be defined for each test script step 330. For example, the definable fields for each test script step may be the following. However, it is to be understood that other fields may be included without departing from the scope of the invention.

TABLE 2

1) testscript step number
2) testscript step name
3) testcase name
4) set datasheet to
5) goto datasheet row number
6) if datasheet current row number is
7) if datasheet row condition true goto testscript step number
8) if datasheet row condition false goto testscript step number
9) assign to variable name
10) assign value
11) execute component/function
12) precondition for executing component/function
13) variable name in which function will return value
14) component/function parameters
15) postcondition after executing component/function
16) status to be reported if postcondition true
17) description to be reported if postcondition true
18) goto testscript step number if postcondition true
19) status to be reported if postcondition false
20) description to be reported if postcondition false
21) goto testscript step number if postcondition false Once the automation suites 310 have been edited and/or created, the project GUI 60 saves the automation suites 310 to be used by the test automation engine 10 in testing the application under test 40. Details of the operation of the test automation engine 10 will now be explained with reference to FIGS. 4-5B.

Figure 4:
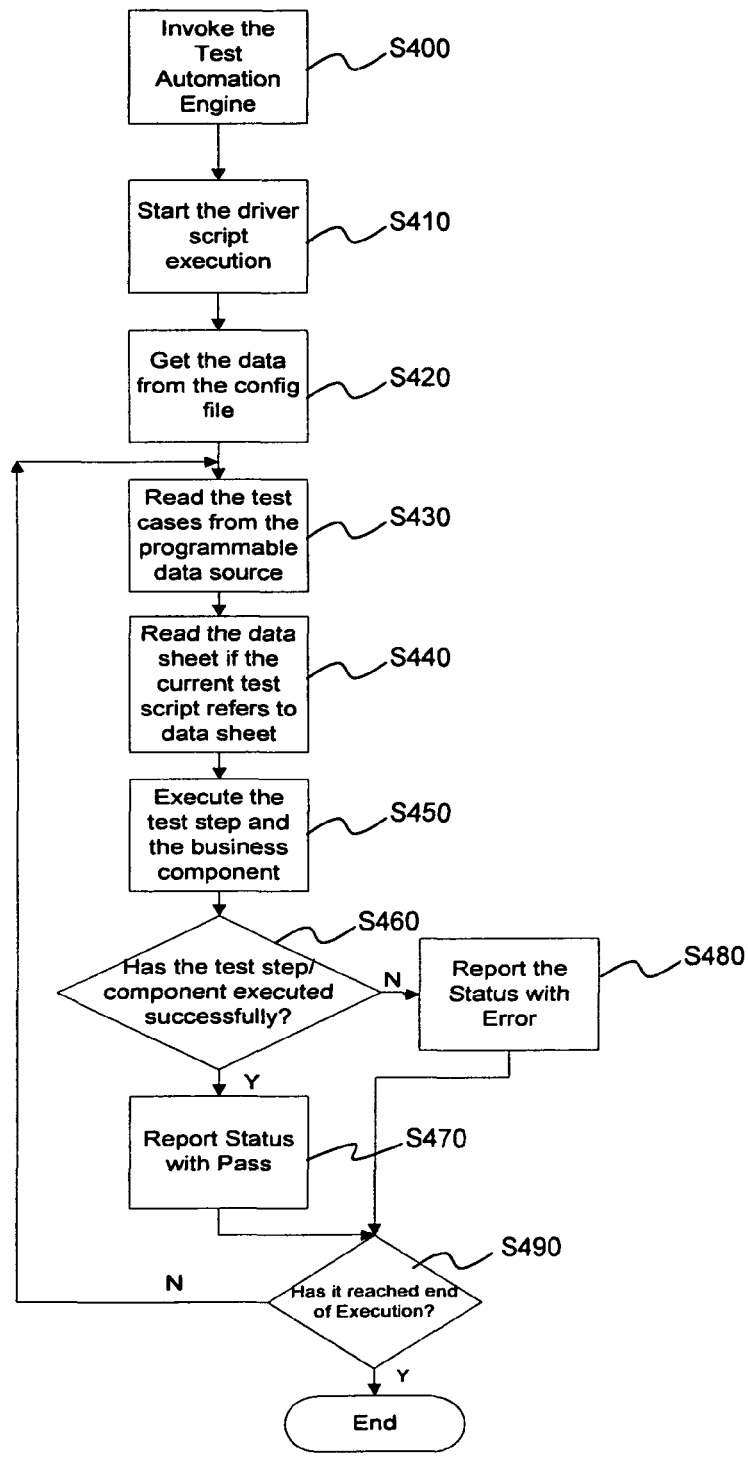
FIG. 4 shows a flow diagram illustrating an exemplary operation of the test automation system and framework of the present invention.

FIG. 4 shows a flow diagram illustrating an exemplary operation of the test automation system and framework of the present invention. To begin the automation testing process, the test automation engine 10 is invoked to initialize the test automation engine 10 based on the init scripts 120. (S400) Depending on the testing tool 30, the appropriate project driver 110 is executed. (S410) The project driver 110 is configured with data from the appropriate config file 130 associated with the project driver 110. (S420) Once the project driver 110 has been configured, the project driver 110 reads the test cases from the programmable data source 140 depending on the run mode set in the config file 130. (S430)

Depending on the automation test scripts 148 associated with the test cases, the project driver 110 reads the appropriate data sheets referred to in the test scripts. (S440) The project driver 110 executes the test step and the business components from the library of business components 20 as defined in the test script 148. (S450) Once the test step and the business component have been executed, the project driver 110 determines if the execution was successful. (S460) If there were no errors, then a report status of "pass" is noted. (S470) If there were errors, then a report status of "error" is noted. (S480) The project driver 110 checks whether all of the test cases have been executed. If so, the testing ends; otherwise, the project driver 110 reads the next test case from the programmable data source 140 and continues the testing process. (S490)

Figure 5A:
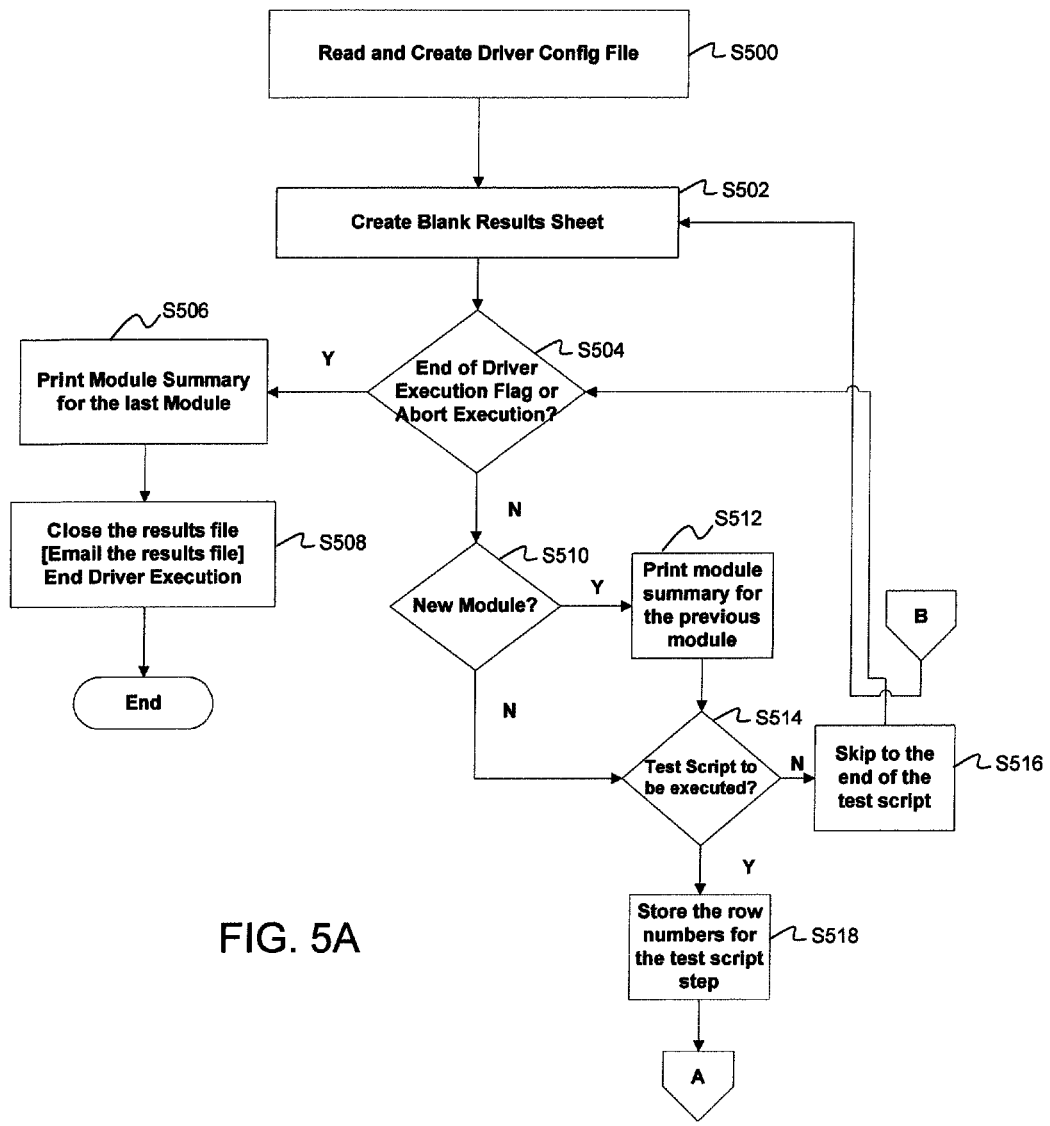
FIGS. 5A and 5B show flow diagrams that illustrate the details of the test automation process in accordance with an exemplary embodiment of the present invention.
Figure 5B:
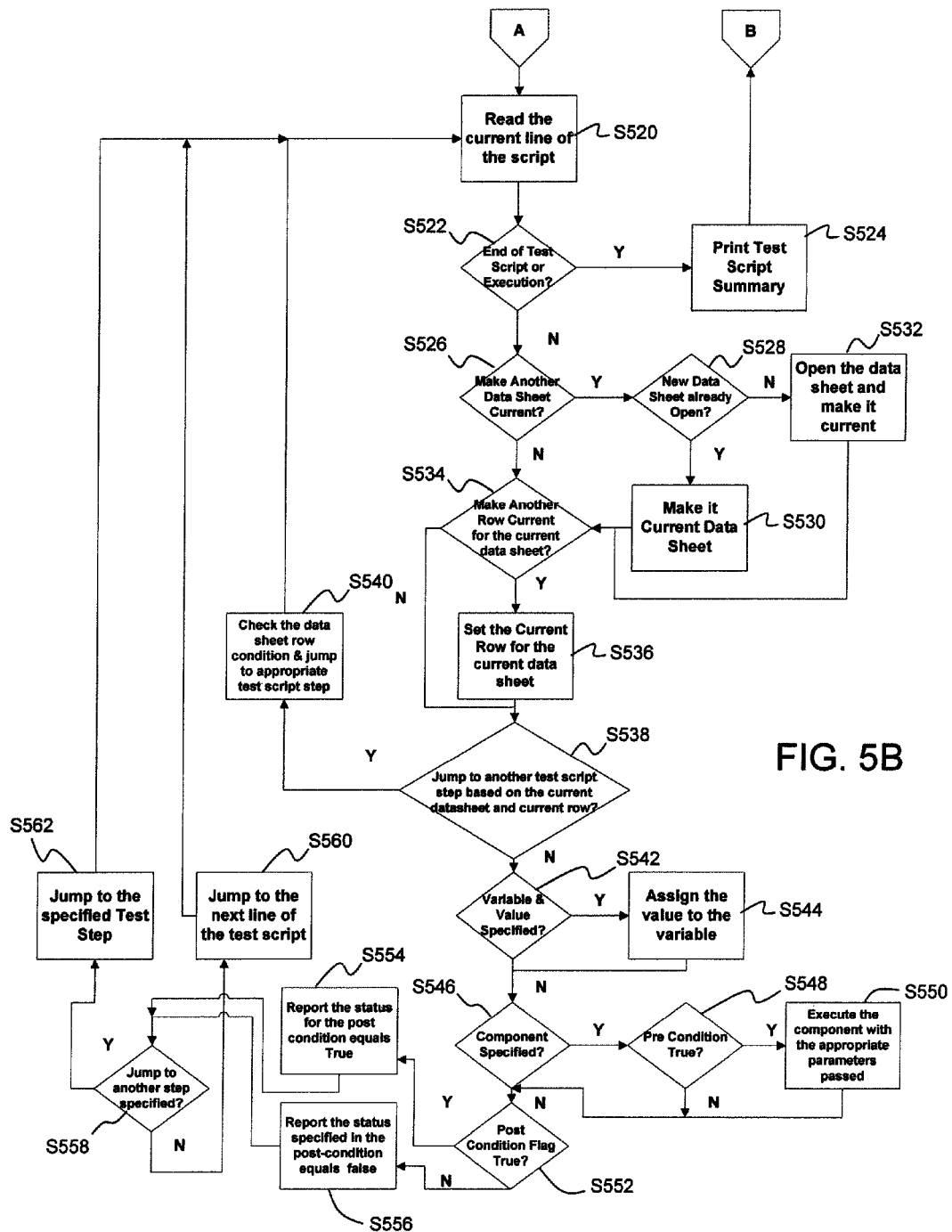

FIGS. 5A and 5B show flow diagrams that illustrate the details of the test automation process in accordance with an exemplary embodiment of the present invention. The testing process in accordance with an exemplary embodiment of the present invention begins with the step of creating a config file 130. (S500) As explained above, the config file 130 specifies the run mode of the test (e.g., "All," "Module," "Selected," etc.) set by the user and other criteria regarding the testing procedure (e.g., email the test result). The created config file 130 is then read by the project driver 110 to begin the testing process by creating a blank results sheet. (S502) If there is any indication to halt further operation (e.g., end of execution flag, abort, etc.) detected by the project driver 110 (S504), then a summary of the result is printed (S506) and the results file is closed. (S508) At this time, if the config file 130 has designated that the result is to be emailed, then the results file containing the results summary is emailed to the designated recipient.

If the end of the driver execution is not at an end (S504), the project driver 110 determines if a new module is to be run. (S510) If a new module is designated, a summary of the previous module is generated before moving on to the new module. (S512) If there are no test scripts to be executed for current module, then the project driver 110 skips to the end of the test script and checks to see if the driver execution has come to an end. (S516) If there are test scripts to be executed (S514), the test script step number is recorded (S518) and the current line of the test script is read (S520). If the current line of the test script indicates an end of the test script execution (S522), then a summary of the test script is generated (S524) and a new blank result sheet is created (S502). Based on the test script to be executed, the project driver 110 determines if an existing data sheet is to be made current. (S526) If yes, then the project driver 110 determines if the data sheet is already open (S528) and makes it the current data sheet (S530). If the data sheet is not open, then the data sheet is opened and made it the current data sheet. (S532) Once the data sheet has been made current, a row within the data sheet is designated to be current if needed (S536) and determined if the process needs to jump to another test script step. (S538) If so, the condition specified in the data sheet row is checked and the process jumps to the appropriate test script step. (S540)

Once the test script step is determined (S538), the test script step is executed to determine if variables and values have been specified (S542), and if so, the appropriate values are assigned to the specified variables (S544). If business components are specified (S546) and pre-conditions exist (S548), the business components are executed and the appropriate parameters are passed on (S550). Depending on if post-condition flag has been set (S552), the appropriate status report is generated (S554, S556) and jump to the next test step (S558, S560) or the next specified test step (S558, S562). The process continues until all of the test script steps are executed until an end is reached for the specified run mode (S504) and a summary of the test results is generated (S506) and processed as specified in the config file 130 (S508).

Figure 6:
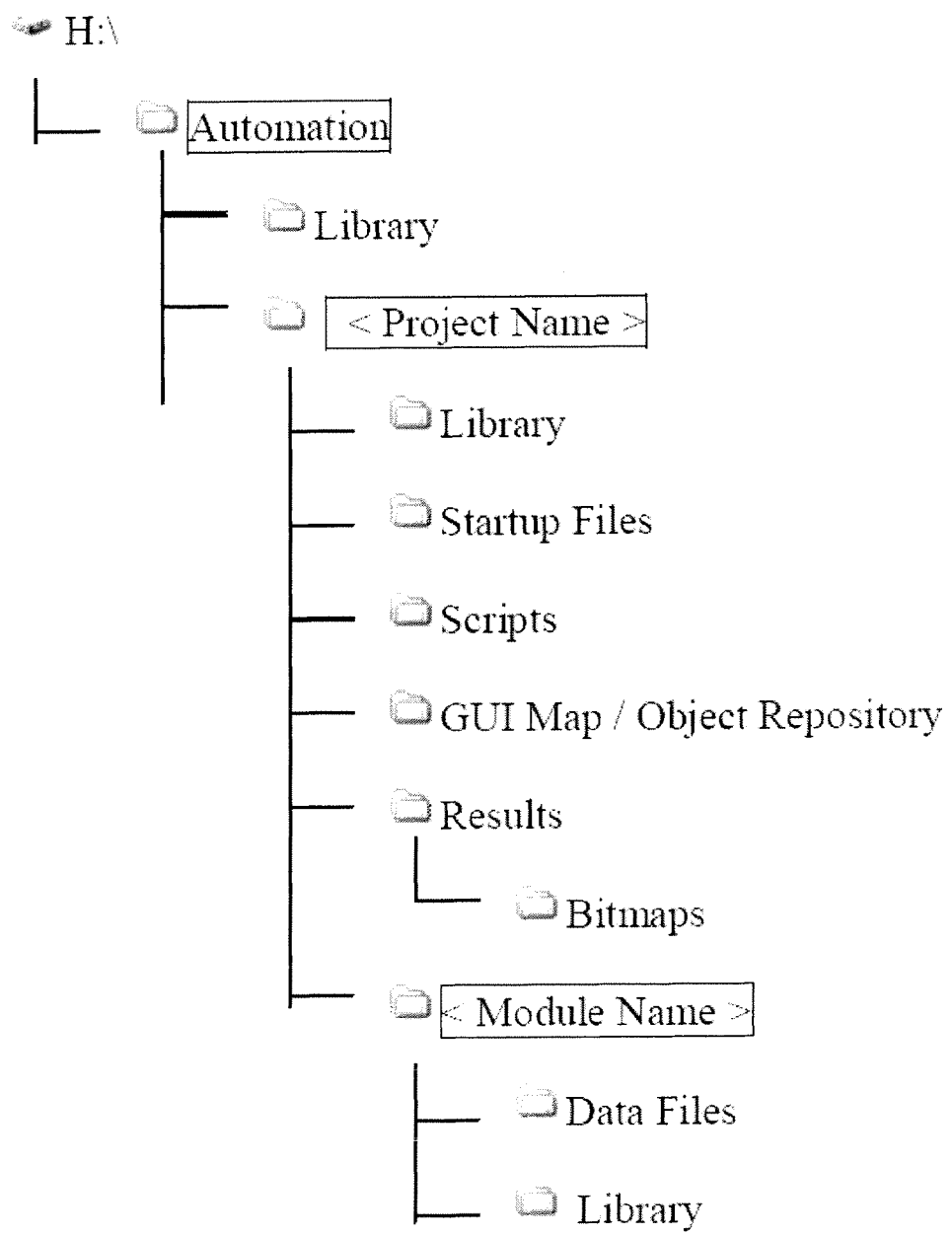
FIG. 6 illustrates an exemplary directory structure in accordance with the test automation system and framework of the present invention.

FIG. 6 illustrates an exemplary directory structure in accordance with the test automation system and framework of the present invention. The details of the exemplary embodiment show in FIG. 6 are explained in the following table. However, it is to be understood that other directory structures and arrangement of the program/data elements may be used without departing from the scope of the present invention.

TABLE 3

| Name | Purpose |
| --- | --- |
| Automation | The main Automation Folder |
| Library | Generic_WR_Functions (compiled module) |
| | Generic_QTP_Functions.vbs |
| | The above files will contain the definitions of functions common across all the projects. |
| <Project Name> | |
| Library | <project name>_WR_Functions (compiled module) |
| | <project name>_QTP_Functions.vbs |
| | The above files will contain the definitions of functions for the project, including the business component functions. |
| Startup Files | <project name>_Driver_Config.txt/.vbs |
| | This file will configure different parameters for the driver script. |
| | <project name>_Driver_Execution_Flag.xls |
| | This is the programmable data source which will contain the automation test scripts. |
| Scripts | <project name>_Init |
| | This script will be executed from WR/QTP startup. It'll define public variables/constants, load project gui map/object repository, load function libraries, define/activate exceptions/recovery scenarios, etc. |
| | <project name>_Driver |

TABLE 3-continued

| Name | Purpose |
|---|---|
| | This is the main script (engine) for the project which will read and execute the programmable data source containing the automation test scripts. |
| GUI Map/Object Repository | <project name>.gui/.tsr<br>This folder will contain the GUI map file or the object repository file for this project. |
| Results | <project name>_Detailed_Results_ddMonthyy-hhmm>.xls<br>This file will contain the detailed test results of the run of the project driver script.<br><project name>_Summary_Report_<ddMonthyy-hhmm>.xls<br>This file will contain the summary results of the run of the project driver script. |
| Bitmaps | <project name>_Bitmap_<ddmmyy-hhmm>.bmp<br>The files with the above naming convention will contain the screen capture done, when some verification fails, if the "bitmaps" parameter is set to true in the driver config file. The name of this file will be reported to test results, whenever a screen capture is done. |
| <Module Name> | |
| Data files | <project name>_<module name>_<testscript name>_TestData.xls<br>This file will contain the test data for the business scenario testscript. |
| Library | <project name>_<module name>_WR_Functions (compiled module)<br><project name>_<module name>_QTP_Functions.vbs<br>The above files will contain the definitions of functions common across different business scenario testscripts of this module. |

Figure 7:
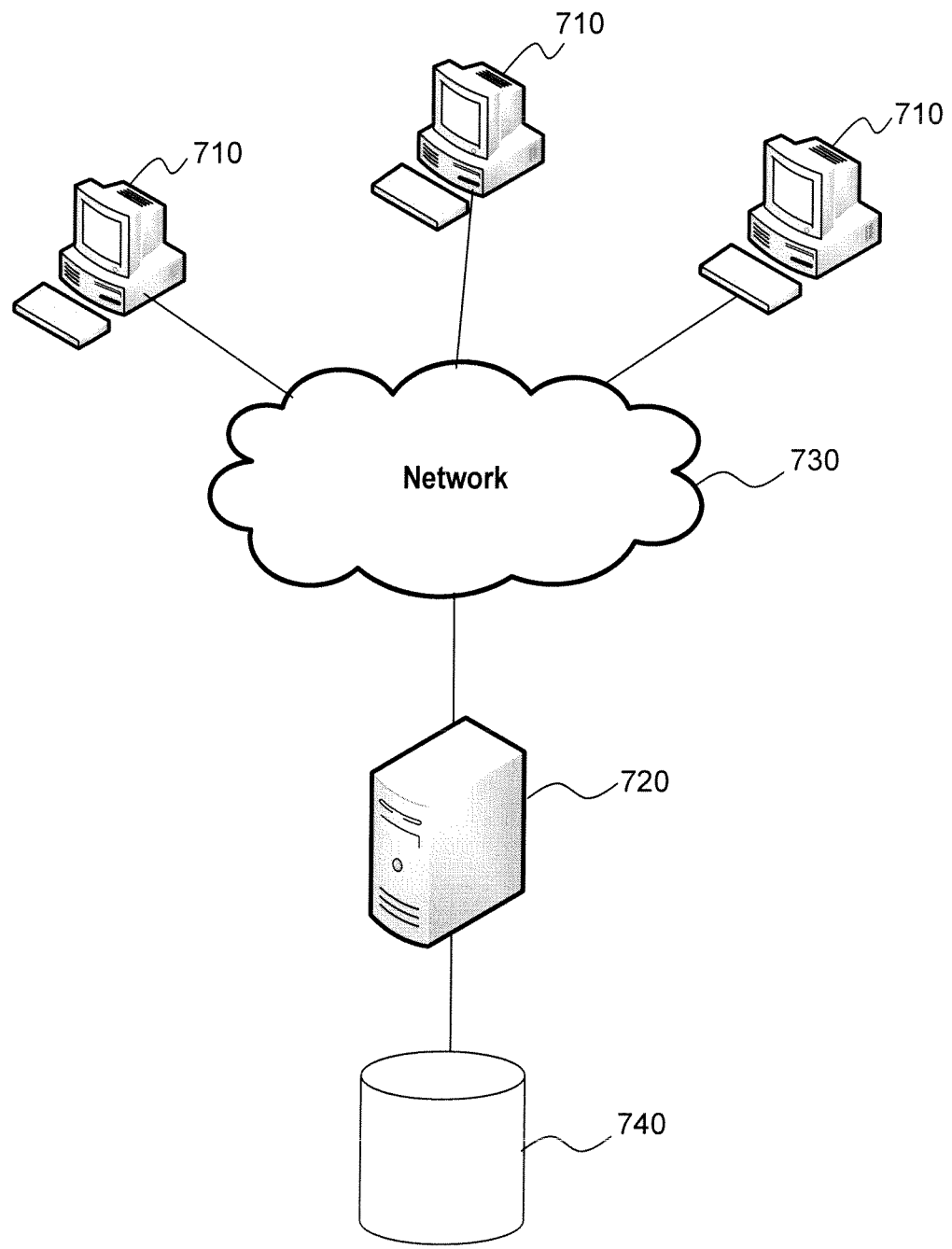
FIG. 7 is a block diagram illustrating an exemplary embodiment of the test automation system and framework in accordance with the present invention.

FIG. 7 is a block diagram illustrating an exemplary embodiment of the test automation system and framework in accordance with the present invention. As shown in FIG. 7, the exemplary embodiment of the present invention includes client devices 710 connected to a system server 720 over a communication network 730. It is to be understood that any type of client device, such as desktop computers, notebooks, handheld computers, and the like, as well as any number of client devices and servers may be used without departing from the scope of the invention. Moreover, any communication network such as, but not limited to, local area networks (LAN), wide area networks (WAN), the Internet, and the like, over wired or wireless communication networks may be used without departing from the scope of the invention.

In one exemplary embodiment, the directory structure and the test automation framework is implemented on the system server 720 and stored on the system data storage device 740. The users (e.g., automation engineers, manual testers, etc.) access the test automation engine 10 implemented on the system server 720 through the client device 710. The business components and programmable data source may be created on the client devices 710 and/or on the system server 720 and stored on the system data storage device 740. The application under test may be tested on the client device 710 by running the test automation engine 10 from the system server 720. In another exemplary embodiment of the present invention, the foregoing components may be implemented on a stand-alone workstation. In another exemplary embodiment, the foregoing components may be implemented on the system server 720 with each client device 710 acting as a terminal. In yet another exemplary embodiment, various foregoing components may be partially implemented on the client device 710 and the system server 720 working in conjunction with each device. It is to be understood that various components of the test automation framework of the present invention may be implemented on various devices without departing from the scope of the invention.

Accordingly, the test automation system and framework in accordance with the present invention helps increase the speed of test automation by leveraging expertise of both the subject matter expert (e.g., manual testers) and the automation expert (e.g., automation engineers) in creating the automation scripts. Scripts can be developed even when the application development is in progress. If the functionality changes, only the specific verification scripts containing the business logic need to be updated. Business components, programmable data sources, test modules, test cases, test scripts, and test script steps are highly reusable within and across applications. Accordingly, existing components and scripts may be used to build different tests for different applications without having to rebuild each testing component for each application. Error handling is much more robust in these scripts and allows unattended execution of the test scripts. Since such scripts have very little interdependency, they can be used in a plug and play manner.

Moreover, the subject matter expert (e.g., manual testers) can create the automation scripts without having technical expertise to use the automation tool. Since subject matter experts (manual testers) thoroughly understand the functionality to be automated, they can create functionally superior automated scripts faster. Automation scripts created in the programmable data source are easy to understand and maintain, compared to scripts created using automation tool. Automation resource just needs to understand the steps of the business component that he/she needs to automate using the automation tool and need not possess thorough knowledge of the functionality being automated.

It will be apparent to those skilled in the art that various modifications and variations can be made in the test automation system and framework of the present invention without departing form the spirit or scope of the invention. Thus, it is intended that the present invention cover the modifications and variations of this invention provided they come within the scope of the appended claims and their equivalents.

What is claimed is:

1. A system for testing a computer application using one of a plurality of different testing tools, the system comprising:
   a processor programmed to execute a test automation engine, the test automation engine including a programmable data source that is testing tool application universal, the programmable data source including one or more automation test scripts that define a test and a plurality of project drivers, each of the plurality of project drivers being configured to read the programmable data source containing the automation test scripts, execute the automation test scripts, and drive one of the plurality of different testing tool applications for testing the computer application using the test, each of the plurality of project drivers being configured to drive only one of the plurality of different testing tool applications; and
   a data storage device that stores results from testing the computer application,
   wherein each of the plurality of project drivers is configured to retrieve and execute a business component based on a corresponding configuration file and corresponding initialization script,
   wherein the initiation script initializes global variables and establish a run time environment, and
   wherein the configuration file includes configuration details for configuring the project driver.

2. The system of claim 1 further comprising a library of business components, wherein the business components are automated business functions configured to be called by the one or more automation test scripts in testing the computer application.

3. The system of claim 1 further comprising a graphical user interface unit configured to access the programmable data source.

4. The system of claim 1, wherein the programmable data source includes one or more project modules, each of the one or more project modules includes one or more of the automation test scripts, and each of the one or more automation test scripts includes one or more test script steps.

5. The system of claim 1 further comprising one or more client devices in communication configured to communicate with the testing device to test the computer application.

6. The system of claim 5, wherein the one or more client devices are configured to communicate with the testing device over a network.

7. A method for testing a computer application using one of a plurality of different testing tool applications, the method comprising:
   accessing a test automation engine that includes a programmable data source;
   configuring the programmable data source that is testing tool application universal, the programmable data source including one or more automation test scripts that define a test;
   selecting and configuring one of a plurality of project drivers to read the programmable data source containing the automation test scripts, execute the automation test scripts, and drive one of the plurality of testing tool applications for testing the computer application using the test, each of the plurality of project drivers being configured to drive only one of the plurality of different testing tool applications, and
   testing the computer application in accordance with the one or more automation test scripts using the one of the plurality of testing tool applications,
   wherein each of the plurality of project drivers is configured to retrieve and execute a business component based on a corresponding configuration file and corresponding initialization script,
   wherein the initiation script initialize global variables and establish a run time environment, and
   wherein the configuration file includes configuration details for configuring the project driver.

8. The method of claim 7, wherein the testing device includes a library of business components, wherein the business components are automated business functions configured to be called by the one or more automation test scripts.

9. The method of claim 7 further comprising the step of accessing the programmable data source via a graphical user interface unit.

10. The method of claim 7, wherein the programmable data source includes one or more project modules, each of the one or more project modules includes one or more of the automation test scripts, and each of the one or more automation test scripts includes one or more test script steps.

11. The method of claim 7 further comprising the step of communicating with the testing device via one or more client devices to test the computer application.

12. The method of claim 11, wherein the one or more client devices are configured to communicate with the testing device over a network.

13. A computer program product for testing a computer application using one of a plurality of different testing tool applications, the computer program product including a non-transitory computer readable medium having stored thereon computer executable instructions that, when executed on a computer, configure the computer to perform the steps comprising:
   accessing a test automation engine that includes a programmable data source;
   configuring the programmable data source that is testing tool application universal, the programmable data source including one or more automation test scripts that define a test;
   selecting and configuring one of a plurality of project drivers to read the programmable data source containing the automation test scripts, execute the automation test scripts, and drive one of the plurality of testing tool applications for testing the computer application using the test, each of the plurality of project drivers being configured to drive only one of the plurality of different testing tool applications, and
   testing the computer application in accordance with the one or more automation test scripts in conjunction with the one of the plurality of testing tool applications,
   wherein each of the plurality of project drivers is configured to retrieve and execute a business component based on a corresponding configuration file and corresponding initialization script,
   wherein the initiation script initialize global variables and establish a run time environment, and
   wherein the configuration file includes configuration details for configuring the project driver.

14. The computer program product of claim 13, wherein the testing device includes a library of business components, wherein the business components are automated business functions configured to be called by the one or more automation test scripts.

15. The computer program product of claim 14 further comprising computer executable instructions that, when executed on the computer, configure the computer to perform the step of accessing the programmable data source via a graphical user interface unit.

16. The computer program product of claim 14, wherein the programmable data source includes one or more project modules, each of the one or more project modules includes one or more of the automation test scripts, and each of the one or more automation test scripts includes one or more test script steps.

17. The computer program product of claim 16 further comprising computer executable instructions that, when executed on the computer, configure the computer to perform the step of communicating with the testing device via one or more client devices to test the computer application.

18. The computer program product of claim 17, wherein the one or more client devices are configured to communicate with the testing device over a network.

19. The system of claim 1, wherein the programmable data source is software testing tool application universal.

\* \* \* \* \*